(12) United States Patent
Bradley

(10) Patent No.: US 8,760,148 B1
(45) Date of Patent: Jun. 24, 2014

(54) PULSE MODULATED PIM MEASUREMENT INSTRUMENT

(75) Inventor: Donald Anthony Bradley, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 552 days.

(21) Appl. No.: 12/840,986

(22) Filed: Jul. 21, 2010

(51) Int. Cl.
*G01R 23/14* (2006.01)
*G01R 7/00* (2006.01)
*G05F 1/613* (2006.01)
*G05F 1/00* (2006.01)

(52) U.S. Cl.
USPC ......... 324/76.23; 324/142; 323/222; 323/284

(58) Field of Classification Search
USPC ........................................ 324/76.23
See application file for complete search history.

(56) References Cited

U.S. PATENT DOCUMENTS

| | | | | |
|---|---|---|---|---|
| 4,991,098 | A * | 2/1991 | Dantzler | 701/1 |
| 5,479,090 | A * | 12/1995 | Schultz | 323/284 |
| 5,513,094 | A * | 4/1996 | Stanley | 363/98 |
| 5,973,568 | A * | 10/1999 | Shapiro et al. | 330/295 |
| 7,068,096 | B2 * | 6/2006 | Chu | 330/10 |
| 7,103,114 | B1 * | 9/2006 | Lapierre | 375/318 |
| 7,511,472 | B1 * | 3/2009 | Xia et al. | 324/142 |
| 7,598,714 | B2 * | 10/2009 | Stanley | 323/222 |
| 7,629,764 | B2 * | 12/2009 | Shoemaker et al. | 318/629 |
| 2002/0030871 | A1 * | 3/2002 | Anderson et al. | 359/150 |
| 2003/0174005 | A1 * | 9/2003 | Latham et al. | 327/172 |
| 2005/0141602 | A1 * | 6/2005 | Hyun et al. | 375/219 |

OTHER PUBLICATIONS

Lui, P.L., Passive intermodulation interference in communication systems, Jun. 1990, Electronics & Communication Engineering Journal, vol. 2, Issue: 3 pp. 109-118.*

* cited by examiner

*Primary Examiner* — Patrick Assouad
*Assistant Examiner* — Christopher McAndrew
(74) *Attorney, Agent, or Firm* — Meyer IP Law Group

(57) ABSTRACT

A device to measure a passive intermodulation (PIM) creating component is provided that uses minimal average power. For a PIM measurement, two separate signals F1 and F2 are generated to simulate signals, such as from two different types of cell phone operating bands being transmitted in the same area or two different transmit frequencies within one cell phone operating band. PIMs are measured to assure interference is not created on one of the cell phone bands. Minimal power is used by connecting pulse width modulators (PWM) to provide DC power to the high power amplifiers (HPA) creating the signals F1 and F2. By controlling the duty cycle of the PWM to limit ON time of the HPAs to approximately 10%, significant average power savings occur. Size is also reduced with reduced power consumption because heat sinks and other cooling components are not required.

20 Claims, 4 Drawing Sheets

PULSE MODULATED PIM MEASUREMENT INSTRUMENT

BACKGROUND

1. Technical Field

The present invention relates to a passive intermodulation (PIM) measurement instrument with circuitry configured to reduce average DC power needed during operation.

2. Related Art

A PIM is an unwanted signal or signals generated by the non-linear mixing of two or more frequencies in a passive device such as a connector or cable. PIM has surfaced as a problem for cellular telephone technologies such as Global System for Mobile Communications (GSM), Advanced Wireless Service (AWS) and Personal Communication Service (PCS) systems. Cable assemblies connecting a base station to an antenna on a tower using these cellular systems typically have multiple connectors that cause PIMs that can interfere with system operation.

The PIM signals are created when two signals from the same or different systems mix at a PIM point such as a faulty cable connector. If the generated PIM harmonic frequency components fall within the receive band of a base station, it can effectively block a channel and make the base station receiver think that a carrier is present when one is not. PIMs can, thus, occur when two base stations operating at different frequencies, such as an AWS device and a PCS device, are in close proximity.

The PIMs can be reduced or eliminated by replacing faulty cables or connectors. Test systems are thus utilized to detect the PIMs enabling a technician to locate the faulty cable or connector. The test system to measure the PIMs, thus, creates signals at two different frequencies, amplifies them, and provides them through cables connecting a base station to antennas on a tower for the base stations. A return signal carrying the PIMs is filtered to select a desired test frequency harmonic where PIMs can be detected and identified to an operator.

PIM testers to date have used continuous wave (CW) signals for the two frequencies used to create the PIM. This is due to the unknown nature of where physically the PIM is located in the transmission path. The PIM is monitored by one technician while the other technician climbs the tower and physically moves the connector joints to see if the PIM changes. Other techniques plot a time graph of the PIM so a single technician can correlate his movement up the tower with results on a graph provided on a plotter below the tower.

FIG. 1 shows a block diagram of components of a prior art test system setup for measuring a PIM. The test system utilizes two signal sources 2 and 12 producing continuous wave (CW) signals, with a first signal source 2 producing a signal at frequency F1 and the second signal source 12 producing a signal at frequency F2. When these multiple signals are allowed to share the same signal path in a nonlinear transmission medium, the unwanted signals can occur. The combined $3^{rd}$ order response is particularly troublesome as it produces an unwanted signal at 2F1-F2 that can pass from one system transmitter into another system's receiver.

The signal at frequency F1 is provided from source 2 to a high power amplifier (HPA) 4. The signal at frequency F2 is provided from source 12 to a high power amplifier 14. Both the high power amplifiers 4 and 14 are shown as 50 W amplifiers, and receive a DC power supply input shown ranging from 100 to 125 Watts to produce a 50 Watt signal output.

The output of each of the amplifiers 4 and 14 is provided through respective isolators 6 and 16 to the input of a power combiner 20. The combiner 20 assures the two carrier signals F1 and F2 are isolated from each other. If they are allowed to combine without isolation, intermodulations would appear due to power output stage nonlinearities. The isolators 6 and 16 are inserted after the power amplifiers 4 and 14 to give additional isolation from any return signal from the combiner 20. The intermodulations are the same frequency as the PIM (2F1-F2), so isolation using both the combiner 20 and the isolators 6 and 16 is critical.

The outputs of the power combiner 20 are provided to duplexer 22. The duplexer 26 provides the signals F1 and F2 to one terminal, while the signal 2F1-F2 is provided to another terminal. The signal 2F1-F2 can be provided to a digital receiver or spectrum analyzer (not shown) for measurement.

The power needed to create the PIM is a standardized 20 W per carrier. Overall for the PIM test circuit of FIG. 1, the DC power supplied to the amplifiers 4 and 14 needs to be 500 to 625% higher to create the two 20 W output due to efficiency of amplifiers 4 and 14, and RF losses through the isolators 6 and 16, combiner 20 and duplexer 22. This translates to a continuous DC power consumption of 200 to 250 Watts. The loss of power combiner 20 is 3 dB, so 25 W carriers (F1 and F2) can emerge from the combiner while other 25 W carriers that are not needed are dissipated in an internal load 21. The 50 Watt power output of the two amplifiers 4 and 14 is further reduced a total of at least 1 dB above the theoretical 3 dB loss through the combiner 20 due to the losses through cabling. Further losses in the isolators 6 and 16 and duplexer 22 reduce total power so that 20 Watt carriers F1 and F2 are produced from the output of duplexer 22 and provided through cable 17 to antenna 18. PIMs introduced by the cable 17, antenna 18 or other sources receiving the signals F1 and F2 will generate a return signal 2F1-F2 that is provided back through duplexer 22 and directed to a PIM test receiver for processing.

FIG. 2 shows an alternative prior art circuit that reduces the total power needed to provide the 20 Watt PIM carrier signal. The circuit of FIG. 2 accomplishes the power savings by eliminating the hybrid combiner 20 and instead using a frequency duplexer 30. The frequency duplexer 30 combines the two carriers F1 and F2 while isolating them from each other to create outputs at the fixed frequencies F1 and F2 with losses of 0.3 dB rather than the 3 to 4 dB needed by the power combiner/splitter 20 for a savings of 100 to 125 Watts. Components carried over from FIG. 1 to FIG. 2 are similarly labeled, as will be components carried over in subsequent figures.

In FIG. 2, without the 3 to 4 dB loss of a power combiner instead of a 50 Watt output from amplifiers 4 and 14, they can have a 25 Watt output and still produce 20 Watt PIM carrier signals. The DC power supply used by the amplifiers 4 and 14 is, thus, reduced by half from 100-125 Watts in FIG. 1, to 50-62.5 Watts in FIG. 2. It would be desirable to provide even more power savings for a PIM measurement circuit.

SUMMARY

Embodiments of the present invention provide a PIM tester with circuitry that reduces average power consumption during operation. This in turn reduces the size and weight of components in the PIM tester.

In particular, embodiments of the present invention add a pulse width modulator (PWM) to provide DC power to each of the high power amplifiers of the PIM measurement instrument. The duty cycle of the PWMs are then controlled to limit power consumption. For instance, with a 10% duty cycle, the total power required by the power amplifiers will only be 10% of the power required when constant DC power is supplied.

Thus, the 100-125 Watts consumed by the circuit in FIG. 1 can be reduced to 10-12.5 Watts average power consumption. Similarly, the 50-62.5 Watts consumed by the circuit in FIG. 2 can be reduced to 5-6.2 Watts.

During operation, PIM signal measurements can be made during the ON time of the amplifiers. Processing and display of the measurements can be made during the OFF time of the amplifiers when PIM measurements will not be available. Single sweep measurements can be made if the time before the next measurement is held off to maintain the ON to OFF time duty cycle. The only user observation will be a slower sweep. The OFF time can, thus, be accomplished in a manner substantially transparent to the user.

By controlling the duty cycle of the PWM to limit ON time of the HPAs relative to OFF time, significant power savings and weight reduction can occur. Size is reduced because heat sinks and other cooling components are not required to dissipate power. Without the cooling components the power amplifiers and duplexers can be significantly lighter. With significantly lower power requirements and minimal sized parts, the PIM measurement system can be portable and battery operated.

BRIEF DESCRIPTION OF THE DRAWINGS

Further details of the present invention are explained with the help of the attached drawings in which.

DETAILED DESCRIPTION

Figure 1:
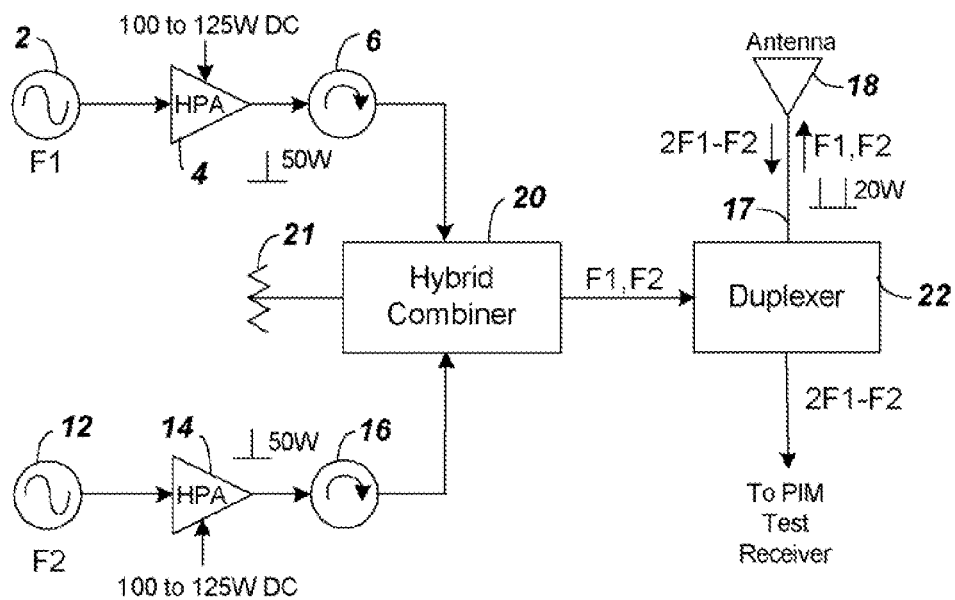
FIG. 1 shows a block diagram of components of a prior art test system for measuring a PIM.
Figure 2:
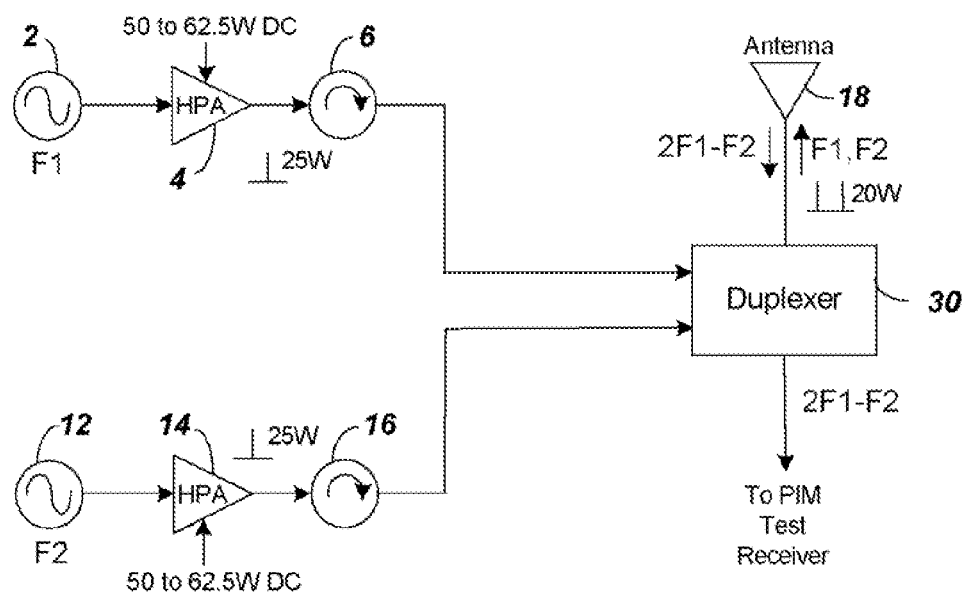
FIG. 2 shows an alternative prior art circuit that reduces total power requirements.
Figure 3:
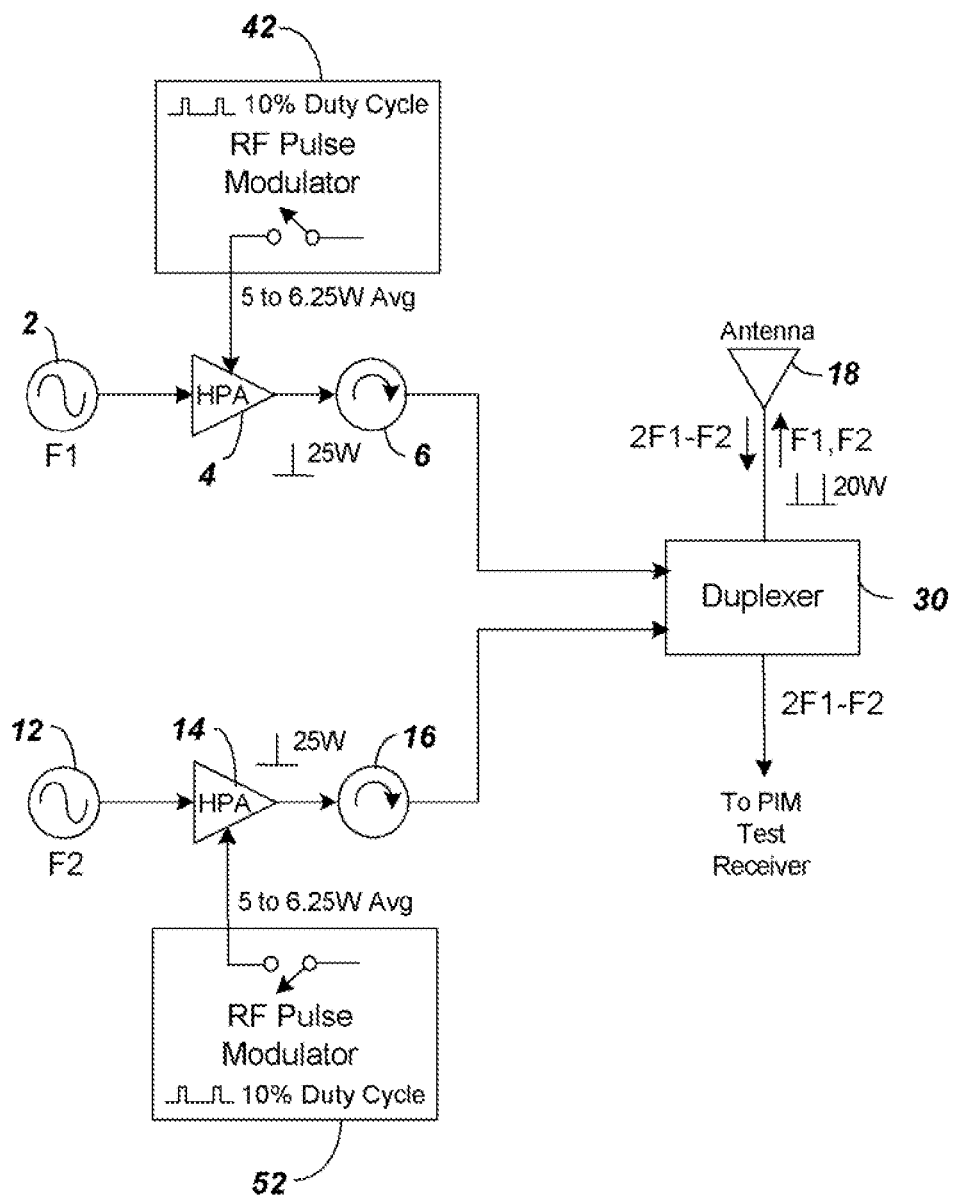
FIG. 3 shows a PIM test circuit according to embodiments of the present invention.

FIG. 3 shows a PIM test circuit according to embodiments of the present invention. The circuit of FIG. 3 modifies the circuitry of FIG. 2 by adding pulse width modulators 42 and 52 to provide DC power to the amplifiers 4 and 14. The pulse width modulators 42 and 52 create a reduction of DC Power by the ratio of their ON to OFF time. Although the pulse width modulators 42 and 52 are shown in FIG. 3 added to the circuitry of FIG. 2, it is understood that similar pulse width modulators could be used with the circuitry of FIG. 1 to obtain a power savings.

The duty cycle for the pulse width modulators is selected to set the DC power consumption. For example, a duty cycle of 10% will reduce the total average power consumption down to 10% of the amount without modulating the peak output power. For the 100-125 average Watts consumed in the circuit of FIG. 1, by supplying power to power amplifiers 4 and 14 with pulse width modulators having a 10% duty cycle, average power consumed will be 10-12.5 Watts. For the circuit of FIG. 2, with the pulse width modulators added to create the circuit of FIG. 3 and a 10% duty cycle selected, the total average power consumption is reduced from the 50-62.5 Watts of FIG. 2 down to the 5-6.25 Watts as shown in FIG. 3.

Although a duty cycle of 10% is shown selected in FIG. 3, it is understood that other duty cycles can be used with a comparable power savings. For example with the circuit of FIG. 3 having a 20% duty cycle, the power required would be 10-12.5 Watts. The limit of the duty cycle will be the availability of a signal to measure the PIM as described in the operation of the circuitry to follow.

As indicated, the reduction of power consumption is controlled by setting the ratio of the ON to OFF time of the pulse width modulators 42 and 52. PIM measurements can be made during the ON time of the power amplifiers 4 and 14. Processing and display can be done in the OFF time of the power amplifiers 4 and 14 when PIM measurements will not be available. Single sweep measurements can be made if the time before the next measurement is held off to maintain the 10% ON to OFF time duty cycle. The only user observation will be a slower sweep. The OFF time can, thus, be accomplished in a manner substantially transparent to the user.

Figure 4:
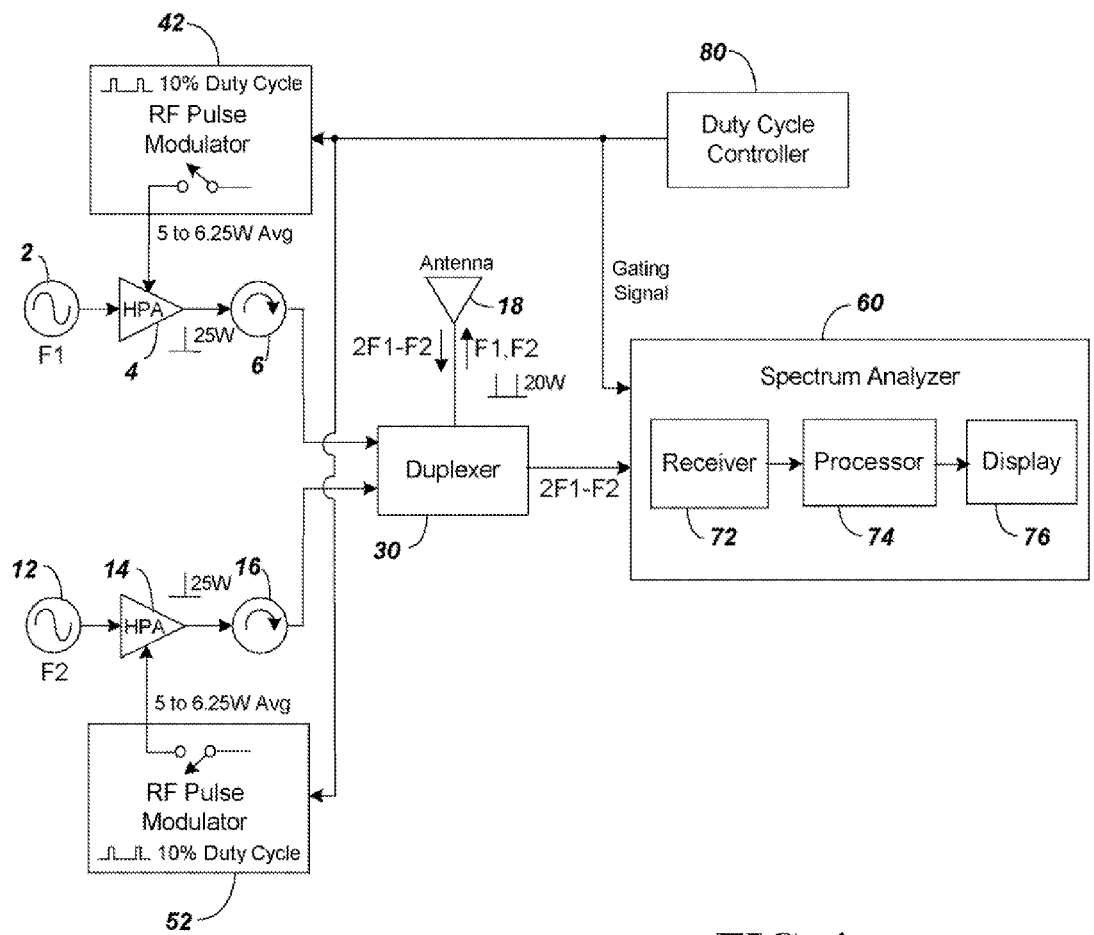
FIG. 4 shows components of a spectrum analyzer connected to receive the output signals of the PIM test circuit of FIG. 3 to display the results to an operator.

FIG. 4 shows components allowing processing of the PIM measurement and display to a user. FIG. 4 adds a gated spectrum analyzer 60 to receive the 2F1-F2 output of the duplexer 30 to accomplish measurement and display of the PIM data. The gated spectrum analyzer includes a receiver 72 for downconverting the measurement signals from the duplexer 30 and converting them to a digital form. A processor 74 can then provide information to an operator to allow the operator to identify the PIM. The processor can provide these measurement results to the display 76. Although not shown, it is understood that the processor can be connected to a memory and a user input device to enable operation. Also, although shown with connection to a spectrum analyzer 60, the output of the duplexer 30 can similarly be connected to other components to allow a user to receive the PIM measurement data.

Along with the added spectrum analyzer 60 shown in FIG. 4 a duty cycle controller 80 is also added in FIG. 4. The duty cycle controller enables setting of the slew rate of PWMs 42 and 52 as well as synchronization of the ON and OFF times of the PWMs 42 and 52. The output of the duty cycle controller 80 further provides a gating signal to the spectrum analyzer 60 to enable synchronization of receiver 72 to downconvert the received PIM signal, since the RF PIM signal 2F1-F2 is now a pulsed spectrum.

In addition to gating the spectrum analyzer input, slew rate control can be enhanced by providing a Gaussian shaped RF input envelope to the power amplifiers 4 and 14. Providing a Gaussian shaped input envelope reduces the RF out-of-band splatter associated with pulsed RF operation. The out-of-band splatter results from a pulsed spectrum since it produces sidebands at frequencies representing the pulse rate. The first sideband null happens at 1/(pulse width) and the bandwidth of the spectrum goes out to 1/(the rise and fall time of the power amplifier turn on/off time). All this out-of-band splatter can be messy when viewed on a spectrum analyzer 60. Shaping the RF signals F1 and F2 so they have rise and fall times that are Gaussian provide rapid decay of the splatter bandwidth. Of course a gated spectrum analyzer used in accordance with the present invention will not display the splatter due to it being enabled only when the RF is settled. Other receivers that are not gated with the signal from controller 80 would see all the splatter. With the Gaussian shaped pulsed F1 and F2 input signals, the filter of the duplexer 30 bounds the acceptable transmit signals to the assigned service bandwidth.

An advantage to using pulse width modulators 42 and 52 to drive the power amplifiers 4 and 14 is that the power amplifiers no longer need massive heat sinks to dissipate power. As indicated previously, instead of dissipating the 100 to 125 Watts of power with the system of FIG. 1, which requires at least a heat sink and possibly additional cooling equipment, a system according to the present invention can require much less. For instance, the 5 to 6.25 Watts average power consumption of the circuit of FIG. 3 may not even require a heat sink. Without the cooling components, the power amplifiers 42 and 52 and duplexer 30 can be significantly lighter. With significantly lower power requirements and minimal sized parts the PIM measurement system can be portable and battery operated.

There are now available one piece RF Power Modules that operate at dedicated frequencies with high peak to average power capabilities. These modules are available from Freescale Semiconductors and can be used to provide the amplifiers 4 and 14 in FIGS. 3 and 4. A typical offering from Freescale Semiconductors is a MW4IC22330NBR1 30 W peak module in a 0.4×1.0 inch package. The average power dissipated in these under pulse RF conditions is 5 Watts maximum.

Although the present invention has been described above with particularity, this was merely to teach one of ordinary skill in the art how to make and use the invention. Many additional modifications will fall within the scope of the invention, as that scope is defined by the following claims.

What is claimed is:

1. A Passive Intermodulation (PIM) measurement instrument comprising:
   a first oscillator providing a signal at frequency F1;
   a first amplifier having a signal input connected to the first oscillator, a power supply input and a signal output;
   a first pulse width modulator (PWM) connected to the power supply input of the first amplifier;
   a first isolator having an input connected to the output of the first amplifier and having an output;
   a second oscillator providing a signal at frequency F2 that is different that the frequency F1 of the first oscillator;
   a second amplifier having a signal input connected to the second oscillator, a power supply input and a signal output;
   a second PWM connected to the power supply input of the second amplifier;
   a second isolator having an input connected to the output of the second amplifier and having an output; and
   a signal combiner receiving the output of the first isolator and the second isolator and providing an PIM measurement signal with a combined signal frequency F1 and F2;
   wherein active portions of a duty cycle of the first PWM are synchronized to active portions of a duty cycle of the second PWM and inactive portions of the duty cycle of the first PWM are synchronized to inactive portions of the duty cycle of the second PWM such that a power supply of the first amplifier is actively connected to the first amplifier at substantially the same time that a power supply of the second amplifier is actively connected to the second amplifier; and
   wherein the duty cycle of the first PWM and the duty cycle of the second PWM are preset based on target direct current (DC) power consumption of the PIM measurement instrument.

2. The PIM instrument of claim 1, wherein the signal combiner comprises a duplexer.

3. The PIM instrument of claim 2, further comprising:
   a receiver having an input connected to an output of the duplexer, and providing a PIM measurement output.

4. The PIM instrument of claim 3, wherein the receiver is controlled by software stored in a memory to take measurements from the signal combiner during an active portion of the duty cycle.

5. The PIM instrument of claim 4, wherein the receiver is controlled by the software to process and display results from the measurements from the signal combiner during an inactive portion of the duty cycle.

6. The PIM instrument of claim 1, wherein the duty cycle of the first PWM is set to substantially ten percent and the duty cycle of the second PWM is set to substantially ten percent.

7. The PIM instrument of claim 4, further comprising:
   a duty cycle controller having an output provided to control and synchronize active and inactive portions of the duty cycle of the first PWM and the second PWM, and the output of the duty cycle controller further providing a gating signal to the receiver.

8. The PIM instrument of claim 7,
   wherein the first oscillator provides a signal with rise and fall times that are Gaussian shaped to the input of the first amplifier, and
   wherein the second oscillator provides a signal with rise and fall times that are Gaussian to the input of the second amplifier.

9. A method of making a Passive Intermodulation (PIM) measurement with a PIM measurement instrument, comprising:
   providing two test signals with different frequencies through two corresponding amplifiers to a signal combiner;
   pulse width modulating power provided to the amplifiers using corresponding pulse width modulators (PWMs);
   wherein active portions of a duty cycle of a first PWM are synchronized to active portions of a duty cycle of a second PWM and inactive portions of the duty cycle of the first PWM are synchronized to inactive portions of the duty cycle of the second PWM such that a power supply of a first amplifier is actively connected to the first amplifier at substantially the same time that a power supply of a second amplifier is actively connected to the second amplifier; and
   wherein the duty cycle of the first PWM and the duty cycle of the second PWM are preset based on target direct current (DC) power consumption of the PIM measurement instrument;
   obtaining a PIM measurement from the output of the signal combiner during the active portion of the duty cycle of the first PWM and the active portion of the duty cycle of the second PWM.

10. The method of claim 9, further comprising:
    processing the PIM signals from the signal combiner during an inactive portion of the duty cycle.

11. The method of claim 9 wherein the duty cycle of the first PWM is set to substantially ten percent and the duty cycle of the second PWM is substantially ten percent.

12. The method of claim 9, further comprising taking a frequency sweep measurement by taking measurements during active portions of the duty cycle and changing frequencies during inactive portions of the duty cycle to a subsequently higher frequency.

13. The method of claim 9, wherein the two test signals are shaped so that rise and fall times are Gaussian.

14. The method of claim 13, further comprising:
    gating a spectrum analyzer receiving outputs of the amplifiers with a signal corresponding to the duty cycle of the pulse width modulation of the amplifiers.

15. The PIM instrument of claim 1, wherein the duty cycle is determined based on a target power consumption of the first and second amplifiers to generate a test signal having a target power level.

16. A system for measuring passive intermodulation (PIM) in response to a test signal comprising:
- a first radio frequency (RF) signal source;
- a first amplifier including a signal input connected to the first RF signal source, a direct current (DC) power supply input, and a signal output;
- a first pulse width modulator (PWM) configured for connecting a direct current to the DC power supply input;
- a second RF signal source;
- a first amplifier including a signal input connected to the first RF signal source, a DC power supply input and a signal output;
- a second PWM configured for connecting a direct current to the DC power supply input;
- a duplexer that receives the signal outputs of the first and second amplifiers, transmits the test signal, and receives the PIM measurement in response to the test signal; and
- wherein the first PWM and the second PWM are configured for connecting respective direct currents to respective DC power supply inputs;
- wherein active portions of a duty cycle of the first PWM are synchronized to active portions of a duty cycle of the second PWM and inactive portions of the duty cycle of the first PWM are synchronized to inactive portions of the duty cycle of the second PWM such that a power supply for the first amplifier is actively connected to the DC power supply input of the first amplifier at substantially the same time that a power supply of the second amplifier is actively connected to the DC power supply input of the second amplifier; and
- wherein the duty cycle of the first PWM and the duty cycle of the second PWM are preset based on target DC power consumption of the system.

17. The system of claim 16, wherein the first RF signal source generates a signal of frequency F1 and the second RF signal source generates a signal of frequency F2, the system further comprising:
- a first isolator having an input connected to the output of the first amplifier and having an output;
- a second isolator having an input connected to the output of the second amplifier and having an output;
- a signal combiner receiving the output of the first isolator and the second isolator and providing the test signal to the duplexer with a combined signal frequency F1 and F2.

18. The system instrument of claim 16, further comprising:
- a receiver having an input connected an output of the duplexer, and providing a PIM measurement output.

19. The system of claim 18, wherein the receiver is controlled by software stored in a memory to
- receive the PIM measurement in response to the test signal from the duplexer during an active portion of the duty cycle, and
- process and display results from the measurements from the duplexer during an inactive portion of the duty cycle.

20. The system of claim 19, further comprising:
- a duty cycle controller having an output provided to control and synchronize active and inactive portions of the duty cycle of the first PWM and the second PWM, and the output of the duty cycle controller further providing a gating signal to the receiver.

* * * * *